May 28, 1946.  L. A. WILLIAMS, JR  2,401,032
HEATING APPARATUS
Filed Dec. 23, 1942  3 Sheets-Sheet 3
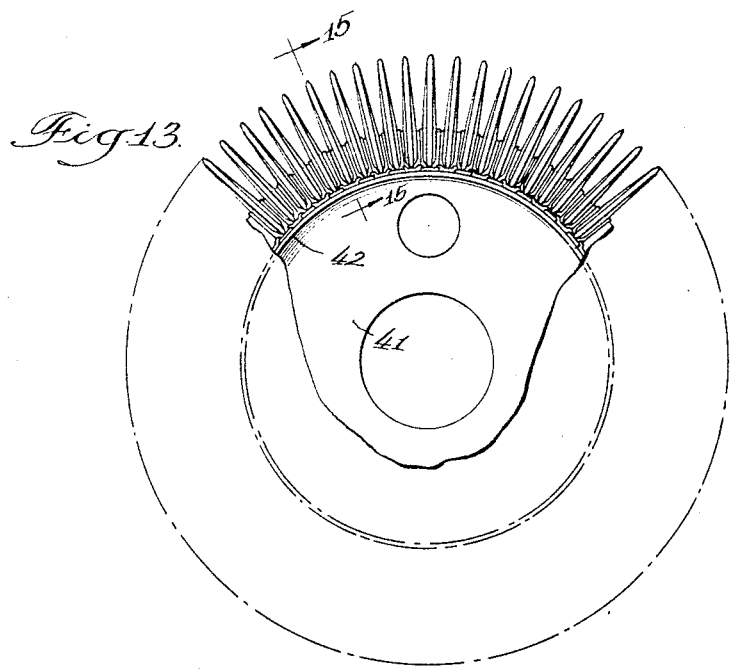
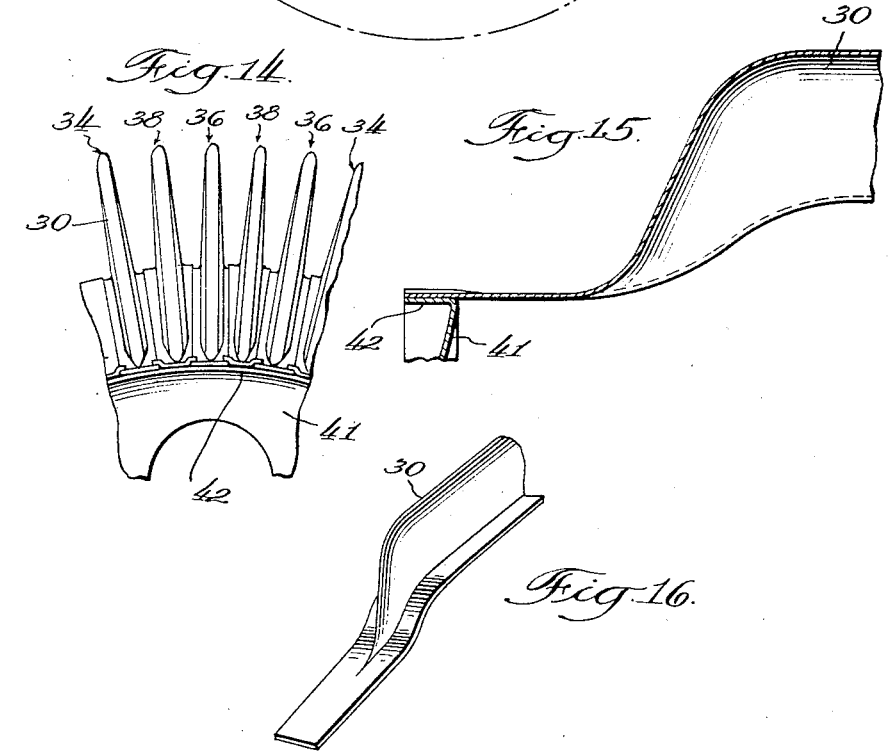

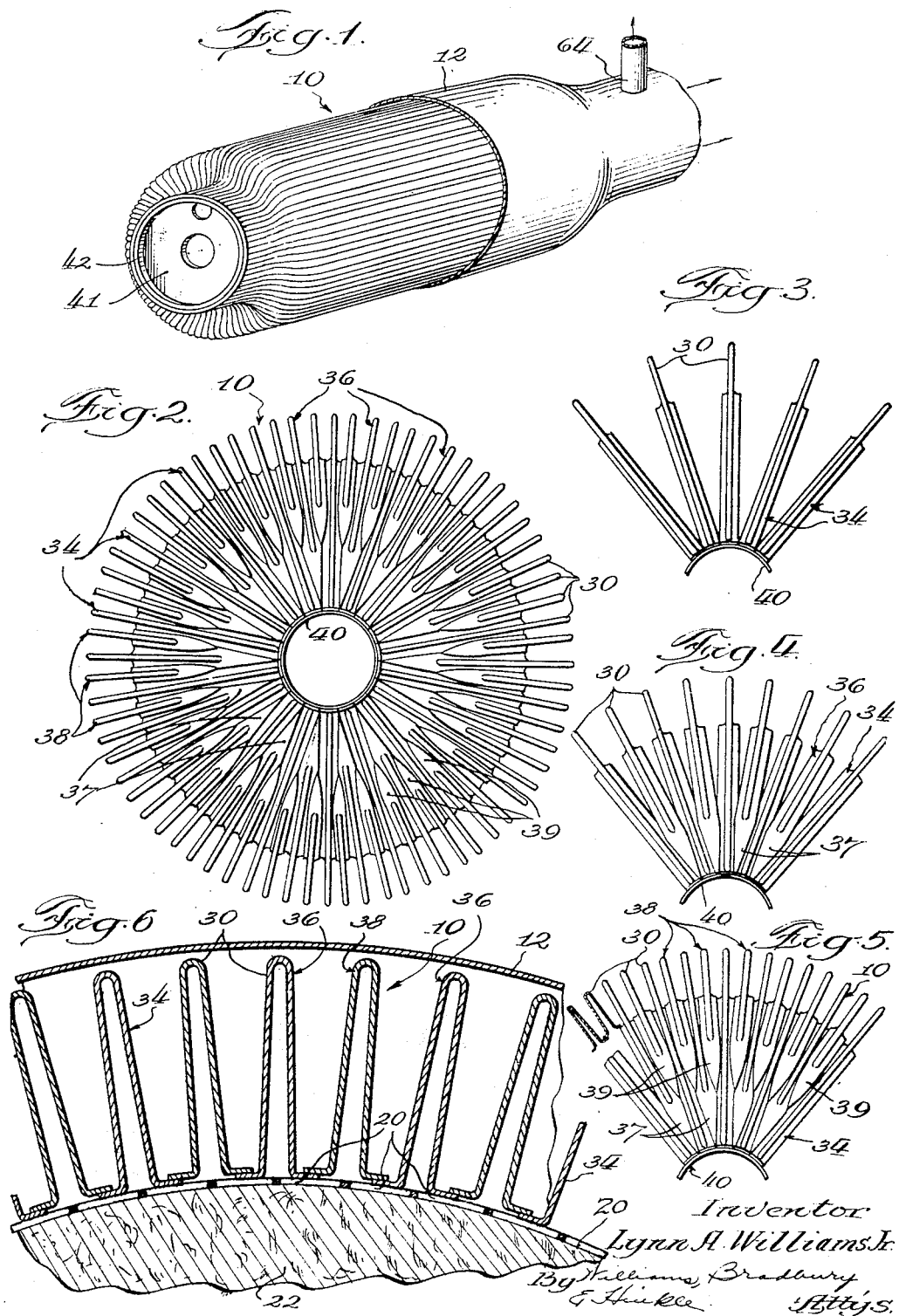

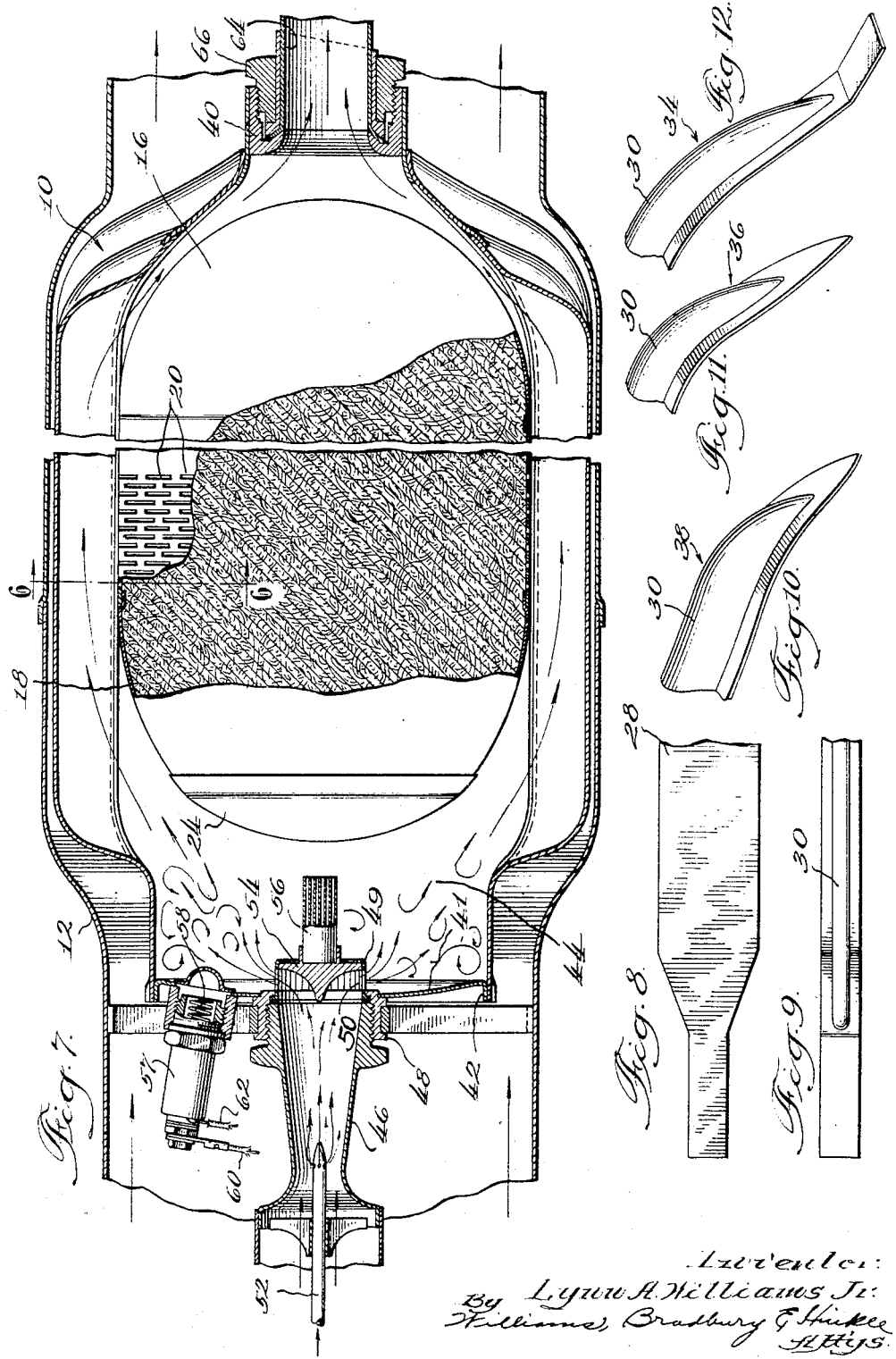

Patented May 28, 1946

2,401,032

UNITED STATES PATENT OFFICE 2,401,032

HEATING APPARATUS

Lynn A. Williams, Jr., Northfield, Ill., assignor to Stewart-Warner Corporation, Chicago, Ill., a corporation of Virginia Application December 23, 1942, Serial No. 469,858

1 Claim. (Cl. 126—118)

My invention relates generally to heaters, and more particularly to heat exchangers for transferring heat from one gas to another.

In heating apparatus, particularly such apparatus designed for use in aircraft, it is of utmost importance that the apparatus be compact and light in weight. Since aircraft frequently operate at high altitudes where the temperature may be as low as —67° F., it is essential that the heat exchanger of such apparatus be capable of transferring a large amount of heat to the air used for ventilating the cabin or other space to be heated.

It is therefore an object of my invention to provide an improved heat exchanger for heating apparatus together with an improved method of making the same, whereby efficient transfer of heat from a heating medium to the air to be heated may be effected.

A further object is to provide an improved heater particularly designed for use on aircraft.

Other objects will appear from the following description, reference being had to the accompanying drawings, in which:

Fig. 1 is a perspective view of the improved heater with a portion of the outer casing broken away to show the heat exchanger;

Fig. 2 is an elevational view of the outlet end of the heater with the casing removed;

Figs. 3, 4, and 5 are fragmentary end elevational views showing the various steps in the method of constructing the heat exchanger;

Fig. 6 is a fragmentary transverse sectional view of the heat exchanger portion of the heater taken on the line 6—6 of Fig. 7;

Fig. 7 is a central longitudinal sectional view of the heater;

Fig. 8 is a fragmentary plan view of one of the blanks from which the fins are formed;

Fig. 9 is a fragmentary plan view of one of the fins after being formed;

Figs. 10, 11, and 12 are perspective views of the outlet end portions of three different fin strips utilized in fabricating the heat exchanger;

Fig. 13 is a fragmentary elevational view of the inlet end of the heat exchanger;

Fig. 14 is an enlarged fragmentary sectional view of the inlet end of the heat exchanger;

Fig. 15 is a fragmentary transverse sectional view showing the manner in which the fins are secured to the combustion chamber head; and, Fig. 16 is a perspective view of the inlet end of one of the fin units.

As best shown in Figs. 1 and 7, the heater of my invention includes a novel form of hollow fin heat exchange element 10 surrounded by a casing 12. Within the hollow fin heat exchange unit 10 is located a muffler 16, which may be formed of a fabricated generally cylindrical casing 18 having a plurality of slots or perforations 20 in the cylindrical portion thereof, and substantially filled with a suitable acoustic vibration-absorbing medium 22, such as glass wool or stainless steel wool. The forward end of the muffler 22 is capped by a hollow nose portion 24, which is conformed to deflect the products of combustion or heating fluid outwardly toward the hollow fin unit 10. As best shown in Fig. 7, the housing 12 may be made in two sections fitting together at about the center of the heater, these sections being secured together either by screws or by welding.

The hollow fin unit 10 is fabricated from a plurality of strips of sheet metal, preferably stainless steel, especially if the hollow fin unit is to be subjected to heated gases of combustion which would have a pronounced corrosive effect upon most other sheet metals. The stainless steel is preferably of a type which includes columbium or titanium as a stabilizer to improve its strength and resistance to corrosion. The metal should be in very thin sheets, as for example, .009" thick, since stainless steel is not a very good conductor of heat, and it is therefore desirable that the distance through which the heat must travel be reduced to the minimum. It has been found that by making the hollow fin unit of stainless steel sheet of this thickness, the hollow fin element is sufficiently rigid to maintain its shape, and will have a long useful life. With this thickness of sheet metal, the transfer of heat from the hot gases to the air to be heated is very rapid and efficient.

The hollow fin unit, as previously stated, is fabricated from formed strips. These strips are drawn from blanks 28, such as shown in Fig. 8, some of these blanks being of such length as to extend the full length of the hollow fin unit 10 and others being slightly longer than the cylindrical portion of this element, while others are of intermediate length. Irrespective of their lengths, the blanks 28 are formed to provide hollow fins 30, each extending throughout the major portion of its length. This forming operation may readily be performed using a steel female die and a rubber male die operated by hydraulic pressure, so as to draw the blank from the shape in which it is shown in Fig. 8 to the shape in which it is shown in Fig. 9.

As previously indicated, the blanks 28 are of different lengths, and the fin elements are likewise of different lengths. The longest fin elements 34 are conformed at their outlet ends, as shown in Fig. 12, the outlet ends of the fin elements 36 of intermediate length being conformed as shown in Fig. 11, and the outlet ends of the short fin elements 38 being conformed as shown in Fig. 10. The inlet ends of the fins 34, 36, 38 may be of similar shape, as shown in Figs. 15 and 16.

To assemble the hollow fin heat exchange unit, the long fin elements 34 have their end portions respectively welded to a flange 42 of a combustion chamber head 41, representative of any suitable inlet fitting, and an outlet fitting 40, as indicated in Fig. 3. The fin elements 36 of intermediate length are inserted between the long fin elements 34 and have their outlet end portions 37 seam-welded to the flanges of the long fin elements near the outlet ends of the latter, to produce the partially complete assembly illustrated in Fig. 4, and have their inlet ends welded to the flange 42.

The short fin elements 38 are then inserted in the spaces between the fin elements 34 and 36, and have their end portions 39 welded to the adjacent flanges of the hollow fin elements 34 and 36. At the same time, the longitudinal edges of the fin elements 38 are seam-welded in overlapped relationship with the edges of the adjacent fin elements 34 and 36. In this manner, they are assembled around the muffler 16 and may be spot-welded to the cylindrical portion thereof at intervals to hold the muffler in position and to add stiffness to heat exchanger as a whole. During the welding operations, the hollow fin elements are preferably held in suitable fixtures which give adequate support for the fin elements and maintain them in proper relative positions.

The resultant heat exchanger may then be used in any apparatus where a rapid and efficient heat transfer between two fluids is required. I have, however, shown the heat exchanger as part of an aircraft heater in which the space 44 adjacent the head 41 is utilized as a combustion chamber.

A suitable induction tube 46 is threaded in a bushing 48 welded to the head 40, the induction tube clamping a mixture distributing fitting 49 in the bushing 48. The fitting 49 projects into the combustion chamber 44 and has a plurality of radial louvered ports 50 formed therein. A combustible mixture is supplied to the combustion chamber through the induction tube 46, which tube may also serve as the carbureting means, shown in Fig. 7 as including a nozzle 52 having a plurality of jet apertures for supplying the liquid fuel for admixture with air forced through the induction tube 46, in which event, the latter is preferably in the form of a Venturi tube, as shown. The combustible mixture flowing from the tube 46 into the combustion chamber through the fitting 49 is given a swirling turbulence producing motion by the louvered ports 50.

Secured to the end of the induction tube 46 is a spreader 54, which aids in causing the rapid flow through the ports 50, this spreader being preferably welded to the fitting 49 and carrying a reigniter 56. This reigniter may comprise a thin spirally coiled sheet of heat and corrosion resistant metal, such as Inconel, and is preferably welded to the spreader 54. An igniter 57, including a coil 58 of high resistance wire, is suitably secured in the head 41 and is supplied with energizing current through conductors 60 and 62, the latter being a ground wire.

An outlet tube 64 is provided for the discharge of the products of combustion from the heater, this tube being secured to the fitting 40 by a suitable coupling element 66.

When used as an aircraft heater, the ventilating air to be heated may be obtained from a scoop, ram, or blower, and will thus flow under pressure through the passageways formed between the hollow fins and the casing 16, while the air for combustion may be supplied through the induction tube 46 from the same source of air under pressure, the duct for conducting the ventilating air being independent of the duct for conducting the combustion air to an extent sufficient to prevent the leakage of fuel mixture or products of combustion into the ventilating air stream.

In operation, the igniter 58 will be energized and a fuel valve opened to admit fuel to the jet 52. When the igniter 58 has reached ignition temperature, the combustible mixture will be ignited and burn primarily in the combustion chamber 44. Thus, the ends of the fins forming this combustion chamber will tend to be heated to a temperature higher than the remaining portions of the fins. However, such tendency is counteracted due to the fact that the ventilating air is projected substantially perpendicularly against the outer surfaces of the portions of the fins adjacent the combustion space, and thus is very effective in removing heat from these portions of the fins. The converging ends of the fins near the outlet end of the heater have the products of combustion projected substantially vertically against their inner surfaces so that the heat transfer between the products of combustion and these portions of the fins is very efficient. As a result, the temperature gradient between the inlet and outlet ends of the hollow fin unit 10 is less than it would be were the hollow fin unit of cylindrical form, and the tendency toward overheating the metal surrounding the combustion chamber is avoided.

After the heater attains substantially its normal operating temperature, the igniter 58 is deenergized by suitable thermostatically operated control switch means, and the reigniter 58 will be raised to temperature sufficient to cause reignition of the combustible mixture should the flame be extinguished due to a temporary interruption in the fuel supply or due to any other transient cause.

The hollow fin unit 10 may, when conditions of its expected use permit, be formed of a metal of sufficient ductility to be drawn into two sections, respectively, providing the inlet and outlet portions of the hollow fin unit, and the two sections then welded, brazed, or silver-soldered together to form the complete unit.

While I have shown and described a particular embodiment of my invention, it will be apparent to those skilled in the art that numerous modifications and variations may be made therein without departing from the underlying principles of the invention. It is therefore desired, by the following claim, to include within the scope of my invention all such modifications and variations by which substantially the results of my invention may be obtained by the use of substantially the same or equivalent means.

I claim:

In an aircraft heater, a hollow fin type heat exchanger unit of generally hollow cylindrical form throughout the major portion of its length and having longitudinally extending hollow fins with inwardly tapering end portions, a muffler filling a major portion of the hollow cylindrical space within said unit and leaving a combustion chamber space at one end thereof, means to supply a combustible mixture of fuel and air to said combustion space, means to ignite said mixture within said space, and a casing surrounding said unit and conformed to lie closely adjacent the outer edges of said hollow fins throughout their lengths.

LYNN A. WILLIAMS, Jr.